Dec. 13, 1966 R. V. JENSEN 3,290,870
DISPOSABLE AIR FILTER FOR INTERNAL COMBUSTION ENGINES
Filed Nov. 21, 1963
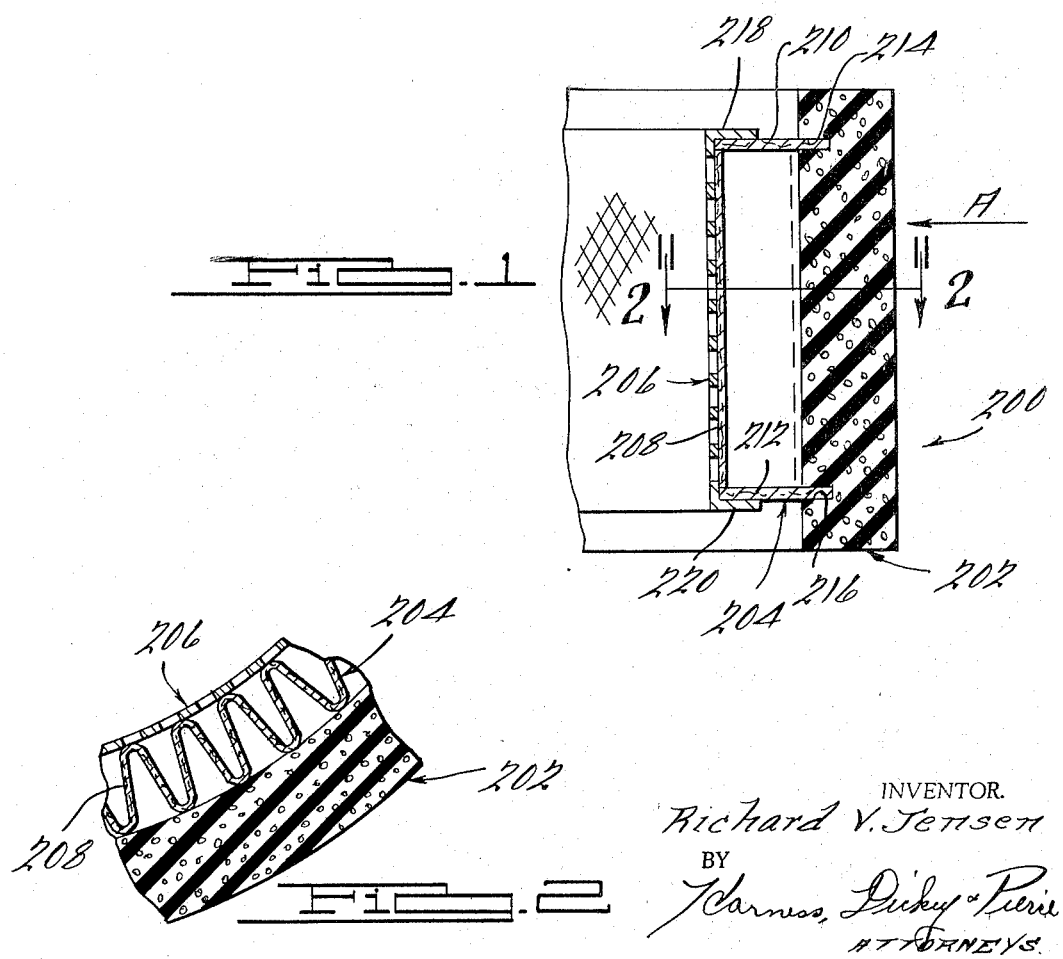
INVENTOR.
Richard V. Jensen
BY
Carness, Dickey & Pierce
ATTORNEYS.

3,290,870
DISPOSABLE AIR FILTER FOR INTERNAL COMBUSTION ENGINES

Richard V. Jensen, Racine, Wis., assignor to Walker Manufacturing Company, Racine, Wis., a corporation of Delaware
Filed Nov. 21, 1963, Ser. No. 325,361
1 Claim. (Cl. 55—486)

This invention relates generally to air filters, and more particularly, to disposable air filters for use in the air intake system of automative or similar type of internal combustion engines.

The air filtering device of the present invention is directed towards a disposable filter unit which is characterized by a pair of concentrically oriented filter elements which may, if desirable be constructed of filtering materials of varying porosity or contaminant retaining capacity to provide effective gradient filtration. One of the filter elements extends axially beyond the other filter element and functions as a sealing gasket for the entire filter unit.

It is an object of the present invention to provide an air filtering device which is characterized by universality of installation.

It is another object of the present invention to provide a filtering device in which the air to be filtered passes through two different porosity or flow resistant filtering materials.

It is yet another object of the present invention to provide an air filter of the above character of a simple design that can be easily assembled and economically manufactured.

Other objects and advantages of the present invention will become apparent from the following detailed description taken in conjunction with the accompanying drawings, wherein:

FIGURE 1 is a longitudinal cross-sectional view of a portion of an exemplary embodiment of the air filter unit of the present invention;

FIGURE 2 is a fragmentary cross-sectional view of the structure illustrated in FIGURE 1, taken along the line 2—2 thereof.

Referring now to FIGURES 1 and 2, a two-stage disposable air filter unit 200, in accordance with an embodiment of the present invention, comprises a pair of annular concentric filter elements 202 and 204, and a cylindrical support tube 206. The exterior filter element 202 is constructed of a resilient foam material such as a resilient open celled polyether or polyester urethane foam. The interior filter element 204 consists of an annulus of pleated filter paper 208 which is closed on the top and bottom by rigid end cover plates 210 and 212. The filter element 202 has pair of spaced parallel annular slots 214 and 216 extending radially outward from the interior side thereof which are adapted to receive the radially outer end portions of the cover plates 210 and 212, thereby preventing any relative axial movement between the filter elements 202 and 204.

The support tube 206 is preferably constructed of expanded metal and is provided with flange portions 218 and 220 which extends radially outward to a position above and below the end cover plates 210 and 212, thereby rigidly securing the filter element 204 to the support tube 206.

The upper and lower ends of the filter element 202 extend above and below both the filter element 204 and the support tube 206 so that when the filter unit 200 is operatively mounted within a suitable filter housing (not shown), the ends of the filter element 202 are compressed axially to provide an air-tight seal between the filter housing and the top and bottom of the filter unit 200. This feature further permits the use of nonresilient end cap material for the cover plates 210 and 212, thereby considerably simplifying the construction and reducing the accompanying cost of the filter unit 200.

The relative porosity of the foam material comprising the filter element 202 and the porosity of pleated paper comprising the filtering body of the filter element 204 may be varied widely in accordance with any specific mode of installation or with the amount or degree of gradient filtration desired. For example, by varying the cell size or adjusting the thickness of the filter element 202, an extremely fine filtering paper may be used in the filter element 204 to provide for an extremely high degree of filtration. Alternatively, by increasing the cell size of the foam material comprising the filter element 202, and by using conventional filter paper in the filter element 204, the filtering capacity of the filter 200 may be substantially increased while maintaining excellent filtering efficiency.

By use of a fire retardant paper in the filter element 204, and a suitably treated foam element 202, the filter assembly 200 is well adapted to handle back fire and blow-by gases, and thus may be used in modern crankcase emission recirculation systems.

In operation, the filter unit 200 is mounted in a suitable air filter housing whereby the axial end portions of the filter element 202 act as gasket means to prevent incoming air from flowing around or bypassing the filter elements. The incoming air, which enters the filter housing in the general direction of the arrows A illustrated in FIGURE 1, must therefore pass radially inward through the body sections of the filter elements whereby the dirt and dust contaminants within the air are effectively removed.

While it will be apparent that the preferred embodiment herein illustrated is well calculated to fulfill the objects stated, it will be appreciated that the invention is susceptible to modification, variation and change without departing from the proper scope or fair meaning of the subjoined claim.

What is claimed is:

A disposable filter unit comprised of an annular pleated paper filter media, first and second rigid end caps affixed in sealing relationship to opposite ends of said pleated paper filter media, said first and second end caps extending radially outwardly beyond the outer folds of said pleated paper filter media, a resilient annular body of open celled foamed filter media having an inner diameter less than the outer diameter of said first and second end caps and received around said pleated paper media, said resilient annular body extending axially beyond said first and said second end caps at each of its ends, first and second radially extending slots formed in said resilient body and opening into its inner diameter, said first and said second end caps being sealingly received in said first and second slots, respectively, the respective end portions of said resilient body extending axially beyond said first and said second end caps for resilient compression of said end portions upon insertion of said filter unit into an air filter housing for forming an air seal for said resilient body and for said pleated paper filter media.

References Cited by the Examiner

UNITED STATES PATENTS

| | | | |
|---|---|---|---|
| 1,337,020 | 4/1920 | Milker | 55—502 X |
| 2,019,241 | 10/1935 | Weiss. | |
| 2,864,505 | 12/1958 | Kasten | 210—315 |
| 2,888,095 | 5/1959 | Perrini et al. | 55—487 |
| 2,918,138 | 12/1959 | Lewis | 55—486 |
| 2,966,960 | 1/1961 | Rochlin | 55—502 |
| 2,999,562 | 9/1961 | Lechtenberg | 55—502 |
| 3,026,968 | 3/1962 | Koskinen | 55—525 |
| 3,123,456 | 3/1964 | Boltz et al. | 55—492 |
| 3,143,997 | 8/1964 | Norberg et al. | |

FOREIGN PATENTS

| | | |
|---|---|---|
| 900,450 | 7/1962 | Great Britain. |
| 907,236 | 10/1962 | Great Britain. |
| 936,777 | 9/1963 | Great Britain. |

ROBERT F. BURNETT, *Primary Examiner.*